United States Patent
Baker et al.

(10) Patent No.: US 8,966,126 B2
(45) Date of Patent: Feb. 24, 2015

(54) MULTIPLE PATH LOAD DISTRIBUTION FOR HOST COMMUNICATION WITH A TAPE STORAGE DRIVE

(75) Inventors: Charles Baker, Conifer, CO (US); Miaohui Zhang, Beijing (CN); Xiao Li, Beijing (CN)

(73) Assignee: Oracle International Corporation, Redwood City, CA (US)

( * ) Notice: Subject to any disclaimer, the term of this patent is extended or adjusted under 35 U.S.C. 154(b) by 121 days.

(21) Appl. No.: 13/443,243

(22) Filed: Apr. 10, 2012

(65) Prior Publication Data

US 2013/0268693 A1    Oct. 10, 2013

(51) Int. Cl.
  *G06F 3/00*   (2006.01)
  *G06F 12/00*  (2006.01)

(52) U.S. Cl.
  USPC .............................................. 710/5; 711/111

(58) Field of Classification Search
  CPC ..................... H04L 49/901; G06F 2206/1012; G06F 11/3433
  See application file for complete search history.

(56) References Cited

U.S. PATENT DOCUMENTS

| | | | |
|---|---|---|---|
| 5,937,428 A | 8/1999 | Jantz | |
| 6,029,008 A | 2/2000 | Koyama | |
| 6,044,435 A | 3/2000 | Weissmann | |
| 6,154,852 A | 11/2000 | Amundson et al. | |
| 7,237,056 B2 | 6/2007 | Gold et al. | |
| 2005/0193258 A1* | 9/2005 | Sutton | 714/32 |
| 2006/0285550 A1* | 12/2006 | Do et al. | 370/443 |
| 2008/0298236 A1* | 12/2008 | Ervin et al. | 370/232 |
| 2009/0006733 A1* | 1/2009 | Gold et al. | 711/111 |
| 2009/0059913 A1* | 3/2009 | Duato Marin et al. | 370/389 |
| 2010/0235569 A1* | 9/2010 | Nishimoto et al. | 711/103 |

\* cited by examiner

*Primary Examiner* — Hyun Nam
(74) *Attorney, Agent, or Firm* — Brooks Kushman P.C.

(57) ABSTRACT

A method for a multiple port host to communicate with multiple tape drives is provided by requesting information associated with a particular tape. Information is provided that is indicative of availability status of a plurality of host ports. It is determined if there is a traffic load or a reservation load on an active host port. The active host port is reserved if there is not a traffic load or a reservation load on the active host port. Another method receives input indicative of read/write information from at least one tape drive at a host bus adapter. A host port count is increased, and a size of the read/write information is increased until the read/write information is not accepted by the host bus adapter. The host port count is decreased, and the size of the read/write information is decreased until the read/write information is accepted.

18 Claims, 5 Drawing Sheets

MULTIPLE PATH LOAD DISTRIBUTION FOR HOST COMMUNICATION WITH A TAPE STORAGE DRIVE

TECHNICAL FIELD

Various embodiments relate to load distribution across multiple communication paths between a host and a tape storage device.

BACKGROUND

When a host is communicating with tape on an open storage area network (SAN), each tape drive may be accessible through multiple initiator ports of the host. If multiple, simultaneous tape input/output (I/O) operations are being performed, the System Administrator chooses which host initiator port to access which tape drive.

SUMMARY

According to at least one embodiment, a method for a multiple port host to communicate with multiple tape drives is provided by requesting information associated with a particular tape. Information is provided that is indicative of availability status of a plurality of host ports. It is determined if there is a traffic load or a reservation load on an active host port of the plurality of host ports. The active host port is reserved if there is not a traffic load or a reservation load on the active host port.

According to at least another embodiment, a method for a multiple port host to communicate with multiple tape drives is provided by receiving input indicative of read/write information from at least one tape drive at a host bus adapter. A host port count is increased, and a size of the read/write information is increased until the read/write information is not accepted by the host bus adapter. The host port count is decreased, and the size of the read/write information is decreased until the read/write information is accepted by the host bus adapter.

According to at least another embodiment, a method for a multiple port host to communicate with multiple tape drives is provided by receiving traffic load statistics from a host bus adapter after receiving input indicative of read/write information from at least one tape drive at the host bus adapter. A host port count is decreased and a size of the read/write information is decreased.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
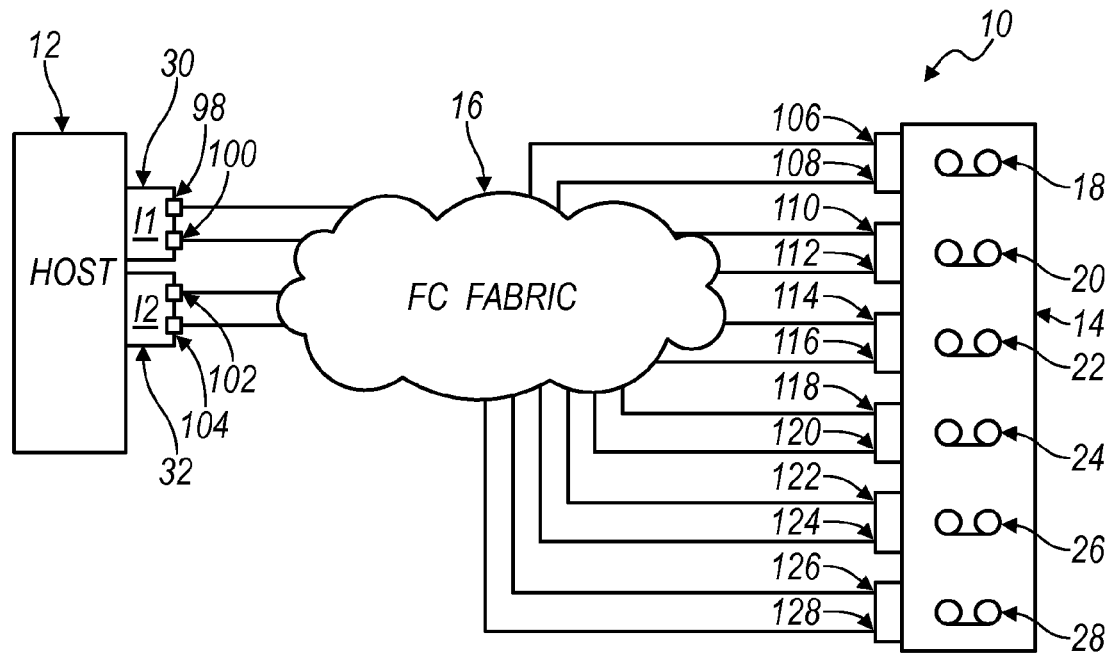
FIG. 1 is a schematic illustration of a prior art communication system between a host and a tape drive system.

Referring now to FIG. 1, a prior art communication system 10 between a host 12 and a data storage system 14 is illustrated. The host 12 may be a controller or a module that requests information from the data storage 14, which, in this system 10, is a tape drive system 14. The host 12 communicates with the tape drive system 14 through a SAN, such as a fibre channel fabric 16. The tape drive system 14 includes a plurality of tape drives 18, 20, 22, 24, 26, 28 in communication with the fibre channel fabric 16. As is known in the art, the tape drive system 14 includes a library for access to stored data in the tape library via read/write operations performed by the tape drives 18, 20, 22, 24, 26, 28. The host 12 includes a plurality of host bus adapters (HBA) 30, 32, each having a pair of initiator ports 98, 100, 102, 104 also in communication with the fibre channel fabric 16.

Due to the serial specifications of tape, port reservations are required for all tape I/O operations. For that reason, a multi-pathing solution for tape cannot follow solutions designed for disk storage. As discussed above, when the host 12 is communicating with tape on a SAN, each tape drive 18, 20, 22, 24, 26, 28 may be accessible through the multiple initiator ports 98, 100, 102, 104 of the host 12. If multiple, simultaneous tape input/output (I/O) operations are being performed, the System Administrator chooses which host initiator port 98, 100, 102, 104 to access which tape drive 18, 20, 22, 24, 26, 28. Due to human error and timing, path selection by the System Administrator may not produce optimal throughput.

FIG. 1 depicts an example of port 98, 100, 102, 104 to tape drive 18, 20, 22, 24, 26, 28 relationships. The system 10 depicted can effectively access forty-eight tape drive paths. That is, each of the six tape drives 18, 20, 22, 24, 26, 28 has two target ports 106, 108, 110, 112, 114, 116, 118, 120, 122, 124, 126, 128 accessible independently on each of the four initiator ports 98, 100, 102, 104. This standard configuration requires the administrator to choose each port to drive connection. The selection method is error prone and may not provide optimal throughput. Depending on the size of the tape fibre channel fabric 16, the tape drive 18, 20, 22, 24, 26, 28 ports 98, 100, 102, 104 selection operation can be very time intensive.

Figure 2:
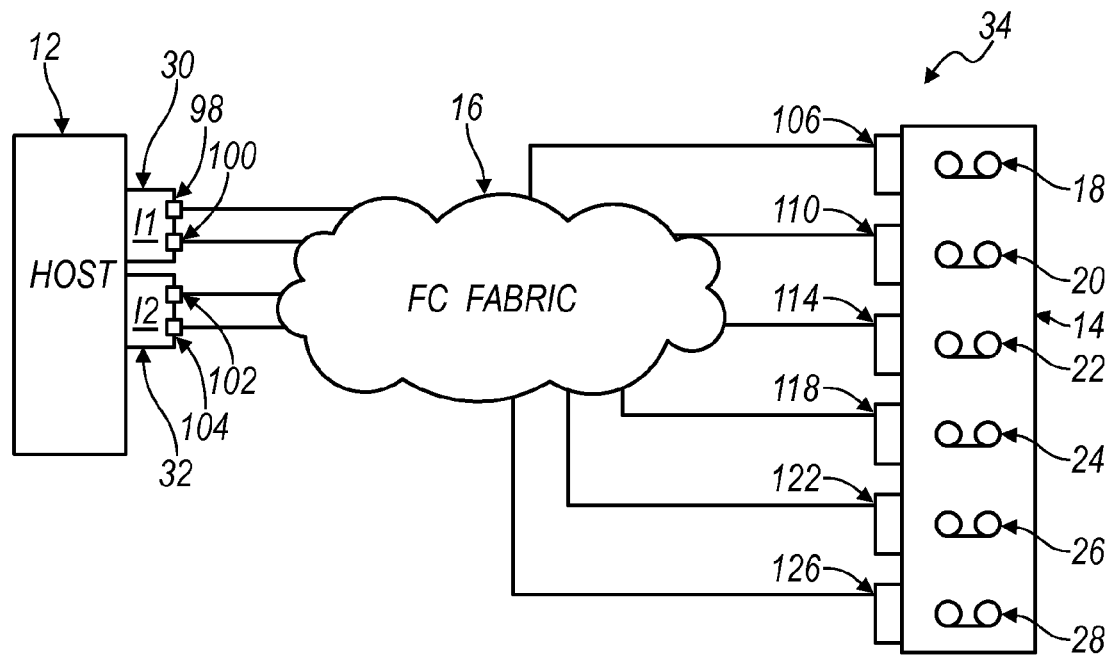
FIG. 2 is a schematic illustration of another communication system illustrating zoning of the communication system.

Referring now to FIG. 2, a communication system 34 with fibre-channel switch zoning may be employed to eliminate multiple paths to a specific tape drive 18, 20, 22, 24, 26, 28. The zoning system 34 establishes a single path to any given tape drive 18, 20, 22, 24, 26, 28. Zoning does not allow dynamic selection for a given I/O stream. Due to tape reservation requirements, dynamic selection for a given I/O stream cannot occur. When the number of tape drives 18, 20, 22, 24, 26, 28 exceeds the number of fibre channel initiator ports 98, 100, 102, 104 on the host 12, I/O delays, or congesting "bottle-necks" occur.

Figure 3:
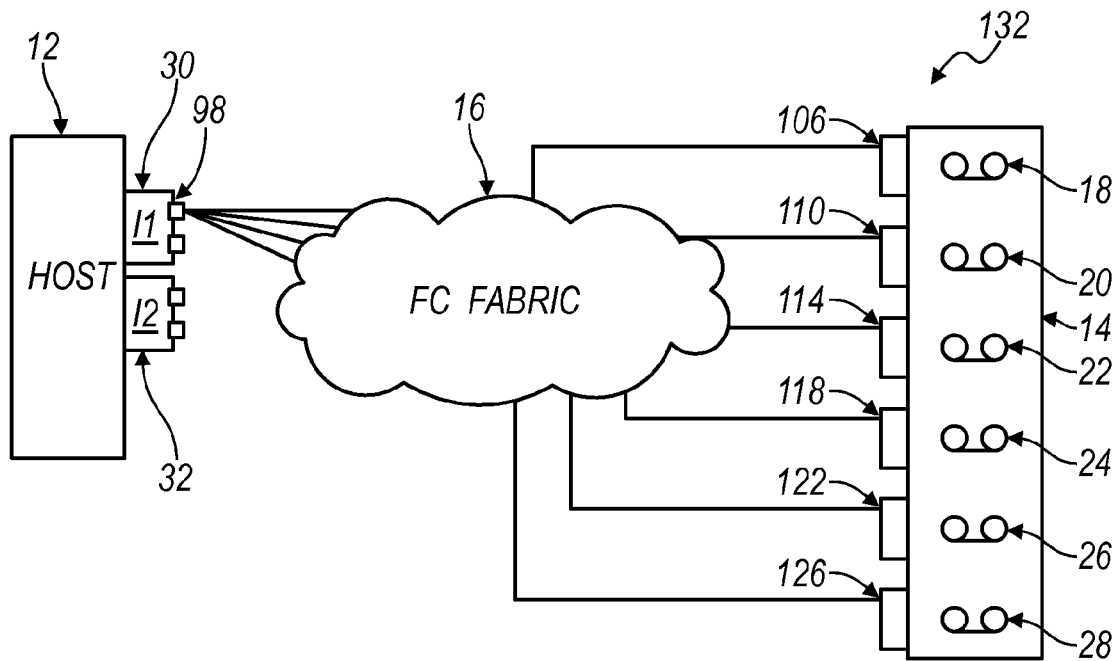
FIG. 3 is a schematic illustration of another communication system illustrating congestion of the communication system.

Another option is the use of multi-pathing software. The multi-pathing solution on tape does not allow I/O on more than a single initiator port 98, so optimal throughput is not obtainable. In FIG. 3, the current multi-pathing solution depicts all six drives 18, 20, 22, 24, 26, 28 attached to a single initiator port 98. When multipath tape is deployed, the drive enumeration attaches to the first port discovered; and the first port discovered is usually a single initiator port 98. FIG. 3 illustrates a communication system 132 schematically with the fibre channel fabric 16 to illustrate potential reservation congestion that is permitted by this system 132, with six tape drives 18, 20, 22, 24, 26, 28 attempting to concurrently communicate with one initiator port 98. The congestion inefficiently employs the resources of the system 132.

Figure 4:
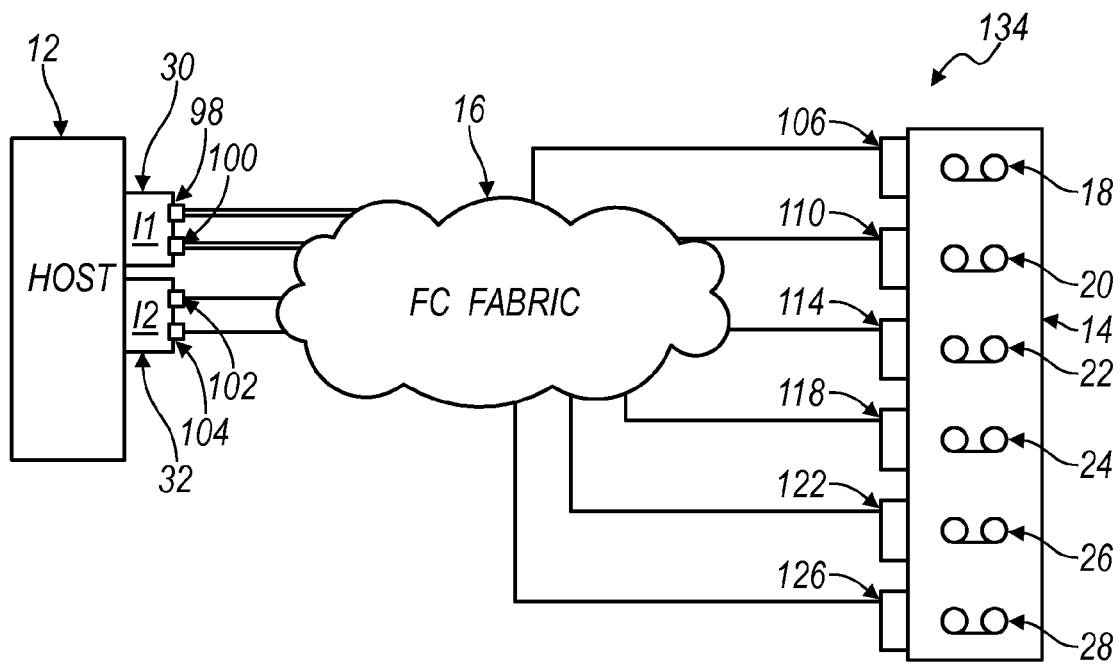
FIG. 4 is a schematic illustration of another communication system illustrating reservations of the communication system.

With reference now to FIG. 4, a communication system 134 is depicted employing an algorithm for providing reservations. The algorithm eases administration and addresses the bottle-necks encountered when performing multiple simultaneous tape I/O and provides a dynamic reservation system 134. The module to support the algorithm may be a multi-pathing kernel module, such as mpxio. Initiator port 98 is attached to drives 18, 26. Initiator port 100 is attached to drives 20, 28. In at least one embodiment, the module is provided within one of the HBAs 30, 32. Alternatively, the module can be provided within the host or any controller; each of which may generally include any number of microprocessors, ASICs, ICs, memory (e.g., FLASH, ROM, RAM, EPROM, and/or EEPROM) which co-act with software code to perform the operations of the HBAs 30, 32. Alternatively, a module is provided within each HBA 30, 32. Of course, any number of modules can be utilized at any location(s) within the system 134.

When a tape I/O request has been made, the module chooses an unused initiator port 98, 100, 102, 104 under the algorithm. If all the initiator ports 98, 100, 102, 104 are in use, the module chooses an initiator port under the algorithm that can best handle the additional load. Every tape task reserves a path and then generates I/O through the reserved port 98, 100, 102, 104. The module distributes the reservations evenly across the initiator ports 98, 100, 102, 104 under the algorithm to minimize the congestion illustrated in FIG. 3. The module maintains a reservation counter for every initiator port 98, 100, 102, 104 under the algorithm. Thus, a reservation weight of a path is a reservation count of the associated port 98, 100, 102, 104. When selecting a path for reservation, the module utilizes the algorithm to select a path with a lowest reservation weight. As illustrated in FIG. 4, the module distributes reservation tasks evenly on different initiator ports 98, 100, 102, 104 under the algorithm. The algorithm may be employed as a module at the host.

Figure 5:
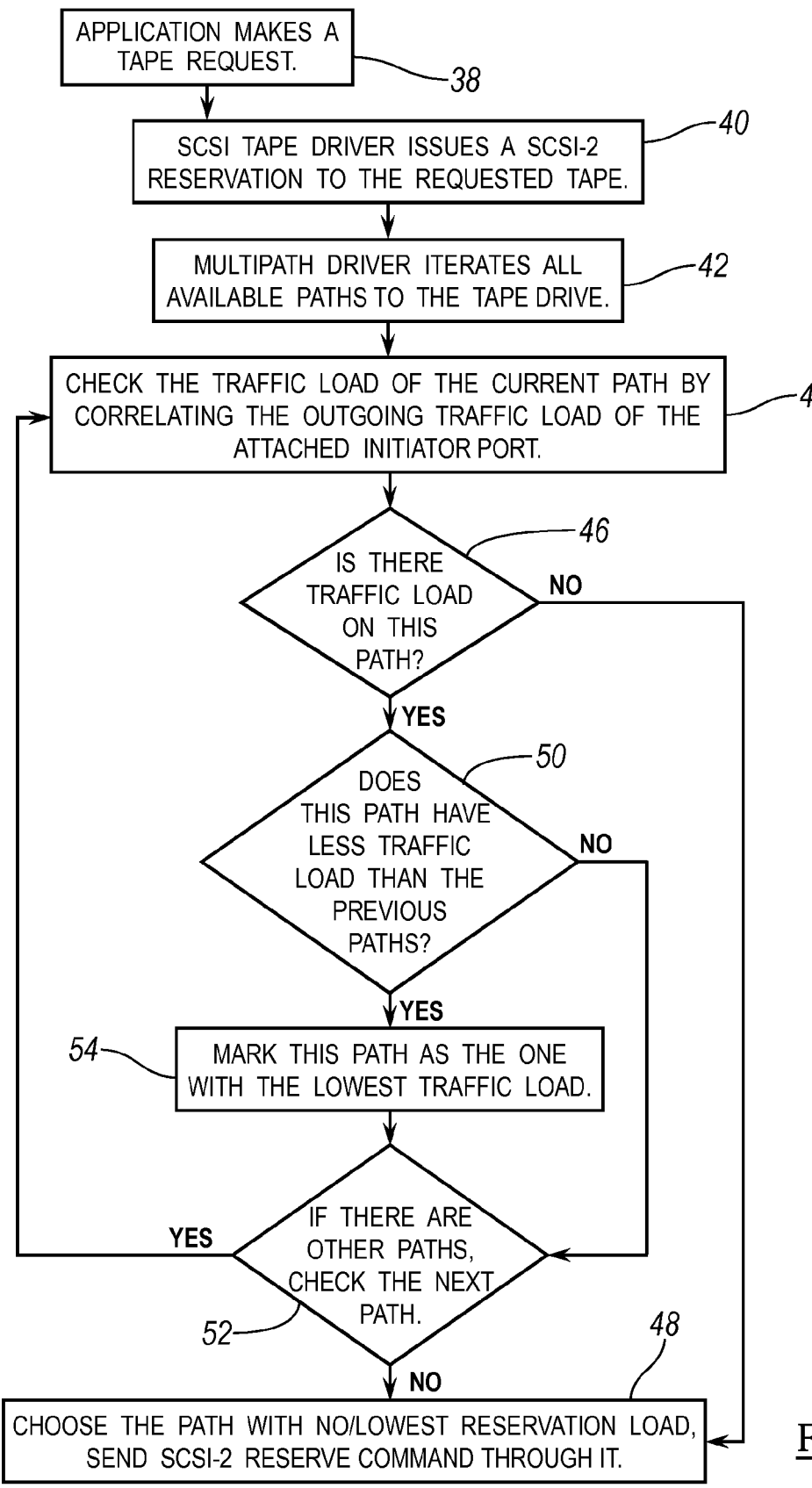
FIG. 5 is a flowchart of a method for a multiple port host to communicate with multiple tape drives according to an embodiment.

Referring now to FIG. 5 an embodiment of the algorithm is represented as a flowchart for port reservations. In other words, the flowchart of FIG. 5 depicts a method for a multiple port host 12 to communicate with multiple tape drives 18, 20, 22, 24, 26, 28. At block 38, the application at the host 12 makes a tape request. At block 40, a small computer system interface (SCSI) tape drive 18, 20, 22, 24, 26, 28 issues an SCSI-2 reservation to the requested tape. A multipath driver iterates all available paths to the associated tape drive 18, 20, 22, 24, 26, 28 at block 42.

At block 44, a traffic load of the active port, such as initiator port 98, is checked by the module. The traffic load is a status of whether the active port 98 is currently communicating with a tape drive 18, 20, 22, 24, 26, 28. A traffic load is also correlated by any outgoing tape requests that will ultimately result in information sent from one of the tape drives 18, 20, 22, 24, 26, 28 to the active host port 98. It is determined by the module at decision block 46 if there is a traffic load on the associated port 98. If there is not a traffic load at the associated port 98, the method progresses to block 48 wherein the port 98 with no traffic load is chosen. Also, at block 48, an SCSI-2 reserve command is sent to the active port 98.

If it is determined by the module that there is a traffic load on the active port 98 at decision block 46, then, at decision block 50, it is determined whether the active port 98 has a traffic load less than previously tested ports. If the active port 98 does not have a lower traffic load than previously tested ports, then the module progresses to decision block 52 according to the method. However, since active port 98 is the first port 98, it is marked by the module as having the lowest traffic load at block 54 before proceeding to decision block 52. At decision block 52, the module determines if there are other ports 100, 102, 104. If there are other ports 100, 102, 104, the next port 100 is checked at block 44 under the algorithm.

If port 100 does not have a traffic load at decision block 46 then port 100 is reserved at block 48 by the module. If port 100 does have a traffic load, the traffic load of port 100 is compared by the module to port 98 at decision block 50. If the port 100 has a lower traffic load than previous port 98, then port 100 is marked by the module as the lowest traffic load at block 54. If port 100 does not have a lower traffic load, then decision block 52 is repeated, wherein the next port 102 is checked and block 44 is repeated. At decision block 46 if port 102 does not have a traffic load, then port 102 is reserved by the module at block 48. Otherwise, port 102 is compared to the previous ports 98, 100 at decision block 50. If port 102 has a lower traffic load, then port 102 is marked as the lowest traffic load at block 54. Otherwise, decision block 52 checks if there are any other ports 104 beyond port 102, and then the port with the lowest traffic load is reserved at block 48 according to the algorithm.

At decision block 50, whichever port 98, 100, 102, 104 has the lowest traffic load when checked as the current port, the port 98, 100, 102, 104 is then marked by the module as having the lowest traffic load at block 54. Then at block 52 the module determines if there are other paths. If the active port 104 is the last port 104, then there are no other paths, and the module progresses to block 48 wherein the port 98, 100, 102, 104 that was marked as having the lowest traffic load at block 54 is reserved.

Figure 6:
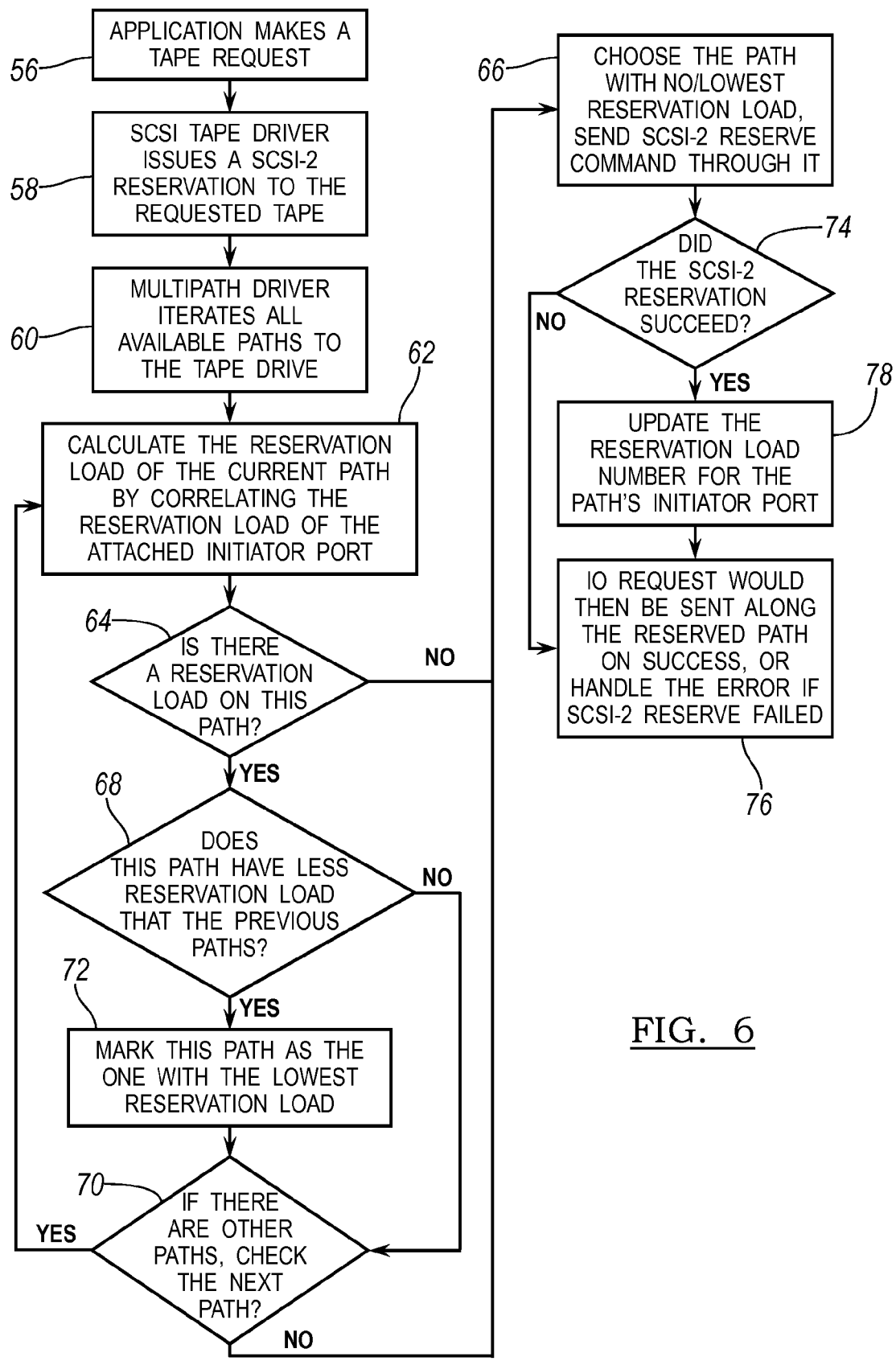
FIG. 6 is a flowchart of a method for a multiple port host to communicate with multiple tape drives according to another embodiment.

Referring now to FIG. 6 another embodiment of the algorithm is represented as a flowchart for port reservations performed by the module in the HBA. In other words, the flowchart of FIG. 6 depicts a method for a multiple port host 12 to communicate with multiple tape drives 18, 20, 22, 24, 26, 28. At block 56, the application at the host 12 makes a tape request. At block 58, an SCSI tape drive 18, 20, 22, 24, 26, 28 issues an SCSI-2 reservation to the requested tape. A multipath driver iterates all available paths to the associated tape drive 18, 20, 22, 24, 26, 28 at block 60.

At block 62, a reservation load of the active port, such as initiator port 98, is calculated by the module. The reservation load is a status of whether the active port 98 has any pending reservations with tape drives 18, 20, 22, 24, 26, 28. It is determined by the module at decision block 64 if there is a reservation load on the associated port 98. If there is not a reservation load at the associate port 98, the module progresses to block 66 wherein the port 98 with no reservation load is chosen according to the method. Also, at block 66, an SCSI-2 reserve command is sent to the active port 98.

If it is determined by the module that there is a reservation load on the active port 98 at decision block 64, then, at decision block 68, it is determined by the module whether the active port 98 has a reservation load less than previously tested ports. If the active port 98 does not have a lower reservation load than previously tested ports, then the module progresses to decision block 70 under the algorithm. However, since active port 98 is the first port 98, it is marked as having the lowest reservation load at block 72 before proceeding to decision block 70. At decision block 70, it is determined by the module if there are other ports 100, 102, 104. If there are other ports 100, 102, 104, the next port 100 is checked by the module at block 62.

If port 100 does not have a reservation load at decision block 64 then port 100 is reserved by the module at block 66. If port 100 does have a reservation load, the reservation load of port 100 is compared by the module to port 98 at decision block 68. If the port 100 has a lower reservation load than previous port 98, then port 100 is marked as the lowest reservation load at block 72. If port 100 does not have a lower reservation load, then decision block 70 is repeated, wherein the next port 102 is checked by the module and block 44 is repeated. At decision block 64, if port 102 does not have a reservation load, then port 102 is reserved at block 66. Otherwise, port 102 is compared by the module to the previous ports 98, 100 at decision block 68. If port 102 has a lower reservation load, port 102 is marked as the lowest reservation load at block 72. Otherwise, at decision block 70 the module checks if there are any other ports 104 beyond port 102, and then the port with the lowest traffic load is reserved at block 66.

At decision block 68, whichever port 98, 100, 102, 104 has the lowest reservation load when checked as the current port, the port 98, 100, 102, 104 is then marked by the module as having the lowest reservation load at block 72. Then at block 70, the module determines if there are other paths. If the active port 104 is the last port 104, then there are no other paths, and the module progresses the method to block 66 wherein the port 98, 100, 102, 104 that was marked as having the lowest reservation load at block 54 is reserved.

At decision block 74, the module determines if the reservation succeeded. If not, the error is handled at block 76. If the reservation succeeded, a reservation load number is updated at block 78, and then an I/O request is sent by the module along the reserved path at block 76.

Figure 7:
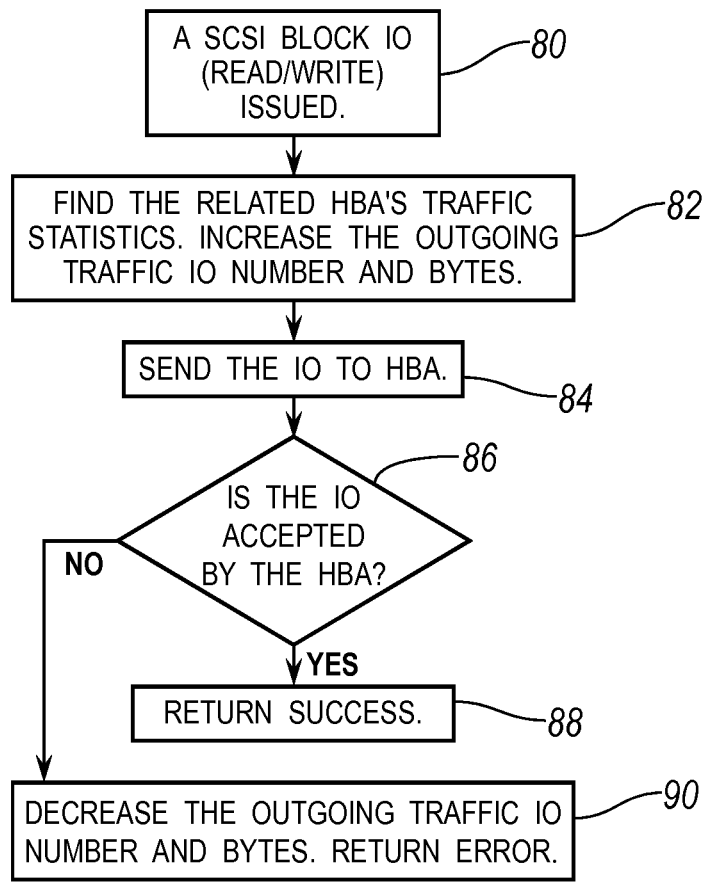
FIG. 7 is a flowchart of a method for a multiple port host to communicate with multiple tape drives according to yet another embodiment.

FIG. 7 illustrates an outgoing traffic load maintenance flow chart performed by the module. At block 80, an SCSI block I/O (read/write command) is issued by the module. At block 82, traffic statistics of the HBA of the host 12 are found. The outgoing traffic I/O number and the bytes are increased. At block 84, the I/O is sent to the HBA. At decision block 86, it is determined if the I/O is accepted by the HBA. If so, a success command is returned in block 88. If not, the outgoing traffic I/O number is decreased in block 90; and an error is returned.

Figure 8:
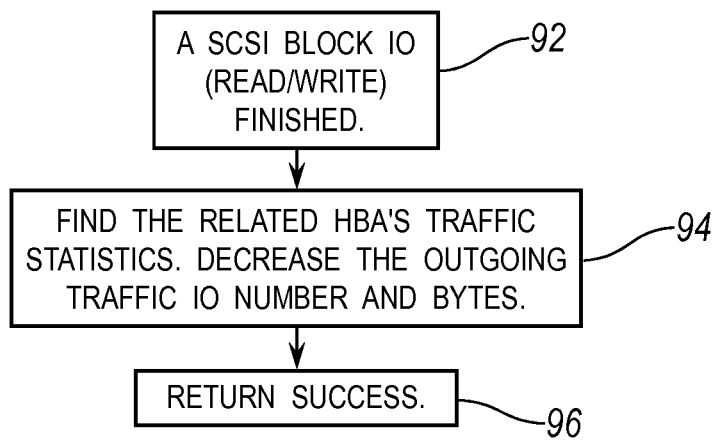
FIG. 8 is a flowchart of a method for a multiple port host to communicate with multiple tape drives according to another embodiment.

FIG. 8 illustrates another outgoing traffic load maintenance flow chart performed by the module. At block 92, an SCSI block I/O (read/write communication) is finished. At block 94, the HBA's traffic statistics are found. The outgoing traffic I/O number and bytes are decreased. At block 96, success information is returned.

A performance test was conducted based on a prototype, for determining performance gain in a host with concurrent tape tasks. An i86 pc host was employed with six host initiator ports, four of which were two Gigabits (Gb), and two were four Gb. Five tape drives with five tapes were utilized. Each I/O task used a one Gb file. The test was conducted with one, three and five tasks with the prior art system 10, and the reservation system 134 utilizing the algorithm(s). The empirical data from the test is illustrated below in Table 1.

TABLE 1

Performance Test Results

| Concurrent task number | Prior art average time per task | Algorithm average time per task | Performance gain |
| --- | --- | --- | --- |
| 1 task | round1: 289.43 s<br>round2: 271.91 s<br>round3: 289.76 s | round1: 271.98 s<br>round2: 271.86 s<br>round3: 288.81 s | 2.22% |
| 3 tasks | round1: 375.75 s<br>round2: 377.10 s<br>round3: 378.17 s | round1: 308.11 s<br>round2: 306.52 s<br>round3: 304.49 s | 23.10% |
| 5 tasks | round1: 529.62 s<br>round2: 531.02 s<br>round3: 531.40 s | round1: 352.80 s<br>round2: 343.03 s<br>round3: 338.26 s | 54.00% |

If only a single tape drive is in use, these changes have minimal advantage over the prior art, unless tape multi-pathing is in use. When tape multi-pathing is employed, an improvement will be seen with a single I/O stream. It is when multiple, simultaneous I/O is underway, that this solution will show a performance advantage. The system 134 eliminates the need for the administrator to choose the tape reservation path, and allows multi-pathing to use more than a single initiator port. Less time may be required for storing and retrieving data from a data storage device.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for a multiple port host to communicate with multiple tape drives, the method comprising:
   requesting information stored on a particular tape;
   providing information indicative of availability status of a plurality of host ports;
   determining when there is at least one of a traffic load and a reservation load on an active host port of the plurality of host ports;
   reserving the active host port when there is not at least one of a traffic load and a reservation load on the active host port, to communicate with the particular tape on a single path;
   reserving a host port with a lowest traffic load when there is a traffic load on the active host port to communicate with the particular tape on a single path; and
   determining when the active host port has a lower traffic load than the other host ports when there is a traffic load on the active host port.

2. The method of claim 1 further comprising providing a reserve command to the active host port.

3. The method of claim 1 further comprising marking the active host port as having a lowest traffic load when the active host port has a lower traffic load than the other host ports.

4. The method of claim 1 further comprising comparing the traffic load of the active host port to the other host ports;

checking a traffic load of a sequential host port if the sequential host port has a lower traffic load than the active host port; and reassigning the sequential host port as the active host port if the sequential host port has the lower traffic load.

5. The method of claim 4 further comprising comparing the traffic load of the active host port to the other host ports;

checking a traffic load of another sequential host port if the sequential host port has a lower traffic load than the active host port; and reassigning the sequential host port as the active host port if the sequential host port has the lower traffic load.

6. The method of claim 5 further comprising reserving a host port with a lowest traffic load if each of the plurality of host ports has a traffic load.

7. The method of claim 1 further comprising reserving a host port with a lowest reservation load when there is a reservation load on the active host port.

8. The method of claim 1 further comprising determining if the active host port has a lower reservation load than other host ports when there is a reservation load on the active host port.

9. The method of claim 8 further comprising marking the active host port as having a lowest reservation load when the active host port has a lower reservation load than the other host ports.

10. The method of claim 8 further comprising comparing the reservation load of the active host port to the other host ports;

checking a reservation load of a sequential host port if the sequential host port has a lower reservation load than the active host port; and reassigning the sequential host port as the active host port if the sequential host port has the lower reservation load.

11. The method of claim 10 further comprising comparing the reservation load of the active host port to the other host ports;

checking a reservation load of another sequential host port if the sequential host port has a lower reservation load than the active host port; and reassigning the sequential host port as the active host port if the sequential host port has the lower reservation load.

12. The method of claim 11 further comprising reserving a host port with a lowest reservation load if each of the plurality of host ports has a reservation load.

13. The method of claim 12 further comprising updating a reservation load number for the reserved host port if the reservation succeeded.

14. A multiple port host to communicate with multiple tape drives, the multiple port host being configured to perform a method according to claim 1.

15. The method of claim 1 further comprising:

receiving input indicative of read/write information from at least one tape drive at a host bus adapter;

increasing a host port count and a size of the read/write information until the read/write information is not accepted by the host bus adapter; and decreasing the host port count and the size of the read/write information until the read/write information is accepted by the host bus adapter.

16. The method of claim 15 further comprising receiving traffic load statistics from the host bus adapter.

17. The method of claim 1 further comprising:

receiving traffic load statistics from a host bus adapter after receiving input indicative of read/write information from at least one tape drive at the host bus adapter; and decreasing a host port count and a size of the read/write information.

18. A multiple port host to communicate with multiple tape drives, the multiple port host being configured to perform a method according to claim 17.

* * * * *

UNITED STATES PATENT AND TRADEMARK OFFICE
CERTIFICATE OF CORRECTION

PATENT NO. : 8,966,126 B2  
APPLICATION NO. : 13/443243  
DATED : February 24, 2015  
INVENTOR(S) : Charles Baker et al.

Page 1 of 1

It is certified that error appears in the above-identified patent and that said Letters Patent is hereby corrected as shown below:

On the Title Page, Item (54) and in the Specification, Column 1, lines 1-3,

Delete:
"MULTIPLE PATH LOAD DISTRIBUTION FOR HOST COMMUNICATION WITH A TAPE STORAGE DRIVE"

and

Insert:
--MULTIPLE PATH LOAD DISTRIBUTION FOR HOST COMMUNICATION WITH A TAPE STORAGE DEVICE--

Signed and Sealed this
Seventeenth Day of May, 2016

Michelle K. Lee
*Director of the United States Patent and Trademark Office*